US009785839B2

(12) United States Patent
Nagano

(10) Patent No.: US 9,785,839 B2
(45) Date of Patent: Oct. 10, 2017

(54) TECHNIQUE FOR COMBINING AN IMAGE AND MARKER WITHOUT INCONGRUITY

(71) Applicant: SONY CORPORATION, Tokyo (JP)

(72) Inventor: Hidetoshi Nagano, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/430,631

(22) PCT Filed: Oct. 18, 2013

(86) PCT No.: PCT/JP2013/078274
§ 371 (c)(1),
(2) Date: Mar. 24, 2015

(87) PCT Pub. No.: WO2014/069248
PCT Pub. Date: May 8, 2014

(65) Prior Publication Data
US 2015/0227798 A1    Aug. 13, 2015

(30) Foreign Application Priority Data

Nov. 2, 2012 (JP) ................. 2012-242411

(51) Int. Cl.
*G06K 9/00* (2006.01)
*G06T 3/00* (2006.01)
(Continued)

(52) U.S. Cl.
CPC ........ *G06K 9/00711* (2013.01); *G06K 9/2063* (2013.01); *G06K 9/3233* (2013.01);
(Continued)

(58) Field of Classification Search
None
See application file for complete search history.

(56) References Cited

U.S. PATENT DOCUMENTS 5,359,704 A * 10/1994 Rossignac ............. G06T 15/405
345/422
5,588,098 A * 12/1996 Chen .................... G06F 3/04845
345/653

(Continued)

FOREIGN PATENT DOCUMENTS

JP    2000-350860 A    12/2000
JP    2005-316972 A    11/2005
JP    2011-96227 A      5/2011

OTHER PUBLICATIONS

Lee, G. A., Billinghurst, M., & Kim, G. J. (Jun. 2004). Occlusion based interaction methods for tangible augmented reality environments. InProceedings of the 2004 ACM SIGGRAPH international conference on Virtual Reality continuum and its applications in industry (pp. 419-426). ACM.*

(Continued)

*Primary Examiner* — Vu Le
*Assistant Examiner* — Samah Beg
(74) *Attorney, Agent, or Firm* — Oblon, McClelland, Maier & Neustadt, L.L.P.

(57) ABSTRACT

The present invention relates to an image processing device, an image processing method, and a program, which combine an image with less sense of incongruity.
A high accuracy marker detector and a high sensitivity marker detector each detects a marker on an image by a different detection method. The high accuracy marker detector detects the position and the posture of the marker with higher accuracy, and the high sensitivity marker detector has a lower accuracy to detect the marker than the high accuracy marker detector, but detects the position of the marker with high sensitivity by prioritizing detecting the marker. A detection result selector selects the optimal detection result from a plurality of the detection results. The present tech-
(Continued)

nique is applicable to, for example, an image processing device which replaces the marker with another image.

12 Claims, 13 Drawing Sheets

(51) Int. Cl.
  *G06T 19/00* (2011.01)
  *G06K 9/46* (2006.01)
  *G06K 9/20* (2006.01)
  *G06K 9/32* (2006.01)
  *G06T 7/73* (2017.01)

(52) U.S. Cl.
  CPC .............. *G06K 9/4604* (2013.01); *G06T 3/00* (2013.01); *G06T 7/73* (2017.01); *G06T 19/006* (2013.01); *G06T 2207/10016* (2013.01); *G06T 2207/30208* (2013.01); *G06T 2207/30244* (2013.01)

(56) References Cited

U.S. PATENT DOCUMENTS

| | | | | |
|---|---|---|---|---|
| 5,936,627 | A * | 8/1999 | Brown | H05K 1/0284 345/419 |
| 6,664,957 | B1 * | 12/2003 | Sato | G06T 15/40 345/420 |
| 6,850,875 | B1 * | 2/2005 | Claffey | B64G 1/66 703/13 |
| 8,698,902 | B2 * | 4/2014 | Kawamoto | G06T 19/006 348/207.1 |
| 8,994,721 | B2 * | 3/2015 | Matsuda | G06F 3/04815 345/419 |
| 2005/0015005 | A1 * | 1/2005 | Kockro | A61B 90/36 600/427 |
| 2005/0234333 | A1 * | 10/2005 | Takemoto | G02B 27/017 600/426 |
| 2007/0008341 | A1 * | 1/2007 | Endo | G06T 19/006 345/633 |
| 2007/0038944 | A1 * | 2/2007 | Carignano | G06T 15/20 715/757 |
| 2008/0043019 | A1 * | 2/2008 | Sellers | G06T 15/10 345/427 |
| 2008/0111832 | A1 * | 5/2008 | Emam | G02B 27/017 345/633 |
| 2008/0304805 | A1 * | 12/2008 | Baharav | G11B 27/034 386/248 |
| 2011/0063325 | A1 * | 3/2011 | Saunders | G09G 5/00 345/639 |
| 2011/0305367 | A1 | 12/2011 | Osako | |
| 2011/0305368 | A1 | 12/2011 | Osako | |
| 2012/0268492 | A1 | 10/2012 | Kasahara | |
| 2012/0288150 | A1 * | 11/2012 | Kido | G06K 9/2018 382/103 |
| 2012/0320216 | A1 * | 12/2012 | Mkrtchyan | H04N 5/33 348/164 |
| 2013/0093788 | A1 * | 4/2013 | Liu | G06F 3/011 345/633 |
| 2013/0113830 | A1 * | 5/2013 | Suzuki | G06T 3/00 345/634 |
| 2013/0182225 | A1 * | 7/2013 | Stout | G03B 15/10 352/48 |
| 2013/0194175 | A1 * | 8/2013 | Tarama | G06F 3/005 345/156 |
| 2014/0055490 | A1 * | 2/2014 | Mule | G06T 11/80 345/633 |
| 2016/0133058 | A1 * | 5/2016 | Kaino | G06T 19/006 345/633 |
| 2016/0140766 | A1 * | 5/2016 | Balachandreswaran | G06T 19/006 345/633 |
| 2016/0163063 | A1 * | 6/2016 | Ashman | G06F 3/011 345/633 |
| 2016/0203369 | A1 * | 7/2016 | Inutsuka | G06K 9/00476 382/113 |

OTHER PUBLICATIONS

Garrido-Jurado, Sergio, et al. "Automatic generation and detection of highly reliable fiducial markers under occlusion." Pattern Recognition 47.6 (2014): 2280-2292.*
Lepetit, Vincent, and M-O. Berger. "A semi-automatic method for resolving occlusion in augmented reality." Computer Vision and Pattern Recognition, 2000. Proceedings. IEEE Conference on. vol. 2. IEEE, 2000.*
Prince, Simon, et al. "3d live: Real time captured content for mixed reality."Mixed and Augmented Reality, 2002. ISMAR 2002. Proceedings. International Symposium on. IEEE, 2002.*
U.S. Appl. No. 14/431,885, filed Mar. 27, 2015, Nagano, et al.
International Search Report issued Dec. 3, 2013 in PCT/JP2013/078274.

* cited by examiner

TECHNIQUE FOR COMBINING AN IMAGE AND MARKER WITHOUT INCONGRUITY

TECHNICAL FIELD

The present disclosure relates to an image processing device, an image processing method, and a program, and particularly, to an image processing device, and an image processing method, and an program which are able to combine an image so as not to feel a sense of incongruity.

BACKGROUND ART

Conventionally, a technique for analyzing an image of a known marker captured by a camera, estimating a position and a posture of the marker on the image, and determining a relative position and the relative posture between the marker and the camera has been developed.

However, when the marker on a video is applied to another image, unless the image is combined to perfectly fit the position and the posture of the marker by accurately estimating the position and the posture, the applied image can be seen as if it is swinging or distorted. Therefore, in order to improve the estimation accuracy of the position and the posture of the image, a known pattern image is mostly used as the marker. However, when the recognition of the pattern image is performed, since an estimation limit is generated in exchange for improving the estimation accuracy, a sense of incongruity in a video as a combining result is caused.

For example, it will be described that a combined video is created by pasting another image on the marker held with a performer's hand. When the performer gradually raises the marker being directed perpendicularly to the camera in order to be captured by the camera, the pattern of the marker comes into sight gradually stretching from the collapsed state. In this case, unless the pattern is seen to some extent, a pattern recognition process cannot be performed, but depending on a recognition method. Therefore, although the marker appears, the pattern recognition cannot be performed and it is determined that the marker does not exist.

Consequently, on the combined image, as the performer raises the marker, the pattern of the marker comes into sight, whereas the video is created on which the marker is suddenly replaced by another image when the pattern recognition process can be performed. In this situation, not only the sense of incongruity is caused by discontinuity of a board (the marker) held with the performer's hand, but the pattern image, which is used for the marker and irrelevant to the combined video, appears.

The problem that the marker is seen is similarly caused in a mixed reality device showing a video combining a reality space and a virtual image to a player wearing a head mound display.

For example, Patent Document 1 discloses a technique for hiding a marker on a combined image by preparing beforehand a reality space image on which the marker is not placed and using the reality space image having no marker for the reality space which has been combined on a virtual image by placing the marker. However, the technique disclosed in Patent Document 1 cannot stably hide the marker, since it is assumed that the marker is continuously detected, when the marker is difficult to detect due to the change of the angle at which the marker can be seen. The change of the angle is caused when the player bends down.

Furthermore, Patent Document 2 discloses a technique for not spoiling a total design, such as an advertising design, with an uninteresting mark by changing a color of a marker itself. However, since the combined image is created after the marker is recognized, until the recognition is completed, the marker is simply output as an output image on the combined image.

CITATION LIST

Patent Documents

Patent Document 1: JP 2000-350860 A
Patent Document 2: JP 2005-316972 A

SUMMARY OF THE INVENTION

Problems to be Solved by the Invention

As described above, when another image is combined by estimating, on the video, the position and the posture of the marker having the known pattern image, the estimation is difficult depending on the posture of the marker with respect to the camera and the pattern image of the marker is seen on the combined image. In this case, since the discontinuity, which occurs because switching the marker to another image is seen, causes the sense of incongruity, a technique for combining the image without causing the sense of incongruity is desired, even when the marker cannot be detected in a process of estimating the position and the posture of the marker.

The present disclosure, in consideration of the situation, can combine the image causing less sense of incongruity.

Solutions to Problem

An image processing device includes: a plurality of detectors configured to each detect a marker appearing on an image by a different detection method; and a selector configured to select, from detection results of the marker by the detectors, the detection result to be used in an image process using the marker.

An image processing method or a program according to an aspect of the present disclosure includes the steps of:
detecting a marker on an image by a plural of different detection methods; and
selecting, from a plurality of detection results of the marker, the detection result to be used in an image process using the marker.

In an aspect of the present disclosure, a marker on an image is detected by a plural of different detection methods, and a detection result, to be used in an image process using the marker, is selected from a plurality of detection results.

Effects of Invention

According to an aspect of the present disclosure, it is possible to combine an image causing a less sense of incongruity.

MODE FOR CARRYING OUT THE INVENTION

Figure 1:
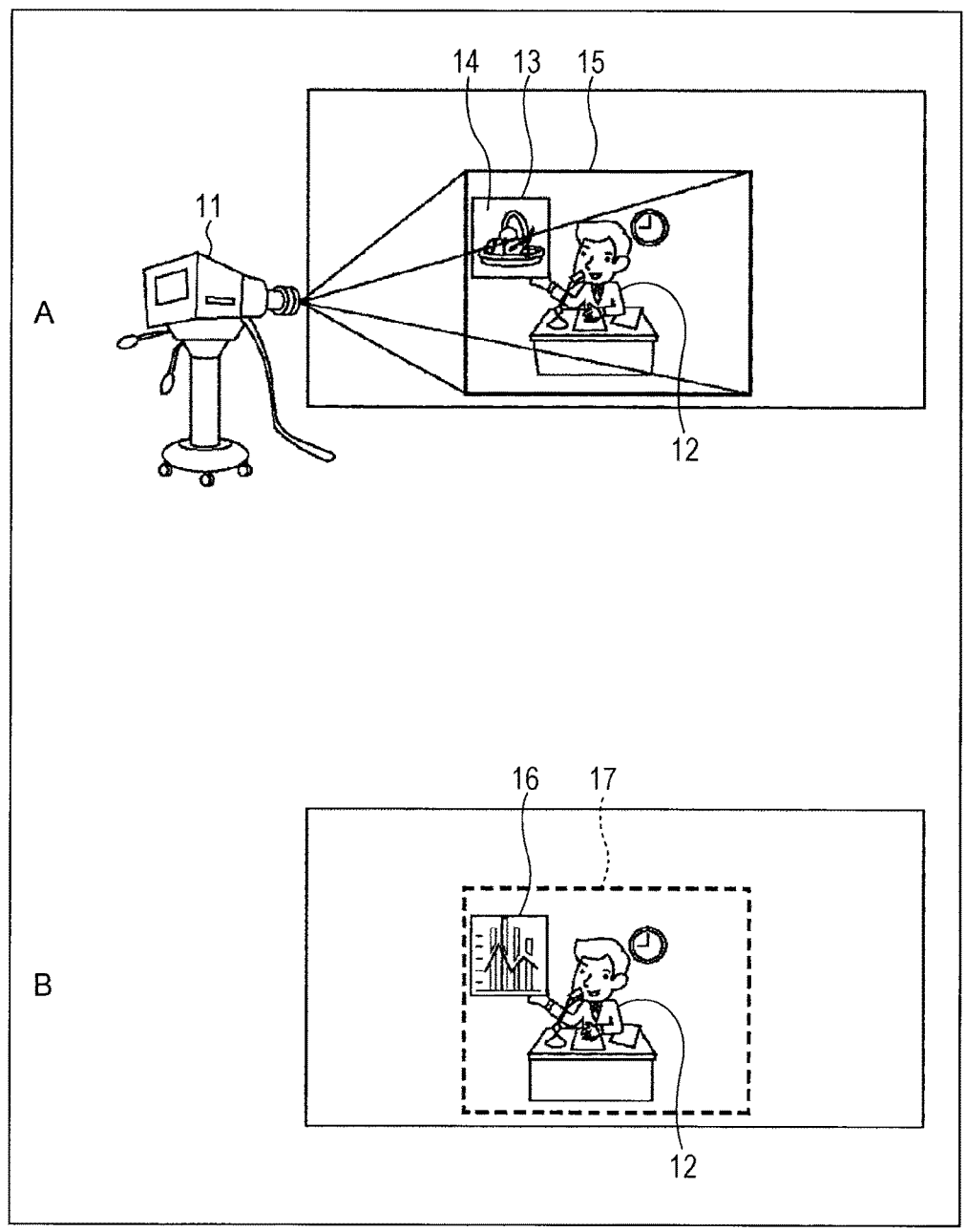
FIG. 1 is a diagram to show an image process of combining an image by replacing a marker held by a performer with another image.

Hereinafter, specific embodiments according to the present technique will be described in detail with reference to the drawings.

First, the image process of combining the image by replacing the marker held by the performer with another image will be described with reference to FIG. 1.

FIG. 1A shows a scene of capturing the performer by the camera. FIG. 1B shows a combining result obtained by performing an image combining process and pasting another image.

As shown in FIG. 1A, a camera 11 captures a performer 12 as an object. In this scene, the performer 12 holds an explanation board 13, and it is assumed that the performer 12 explains using an image pasted by the image process based on a marker 14 of the explanation board 13. Furthermore, in FIG. 1A, an area to be captured according to an angle of view of the camera 11 is shown by a solid line rectangular, and the area inside the rectangular is a captured image 15 captured by the camera 11.

In FIG. 1B, an area shown by a broken line rectangular represents an output image 17 output by performing the image process to the captured image 15 captured by the camera 11. On the output image 17, the image process replaces the marker 14 with a replacement image 16, then the replacement image 16 is displayed. As the replacement image 16, for example, a graph as shown in the drawing is used. The replacement image 16 has flexibility such that it can be changeable according to the proceeding of the explanation by the performer 12, as well as can reproduce a moving image. Therefore, there is a possibility that the explanation board, which is made of paper and conventionally used, will be the explanation board 13 on which the marker 14 is replaceable with a video in the future.

Figure 2:
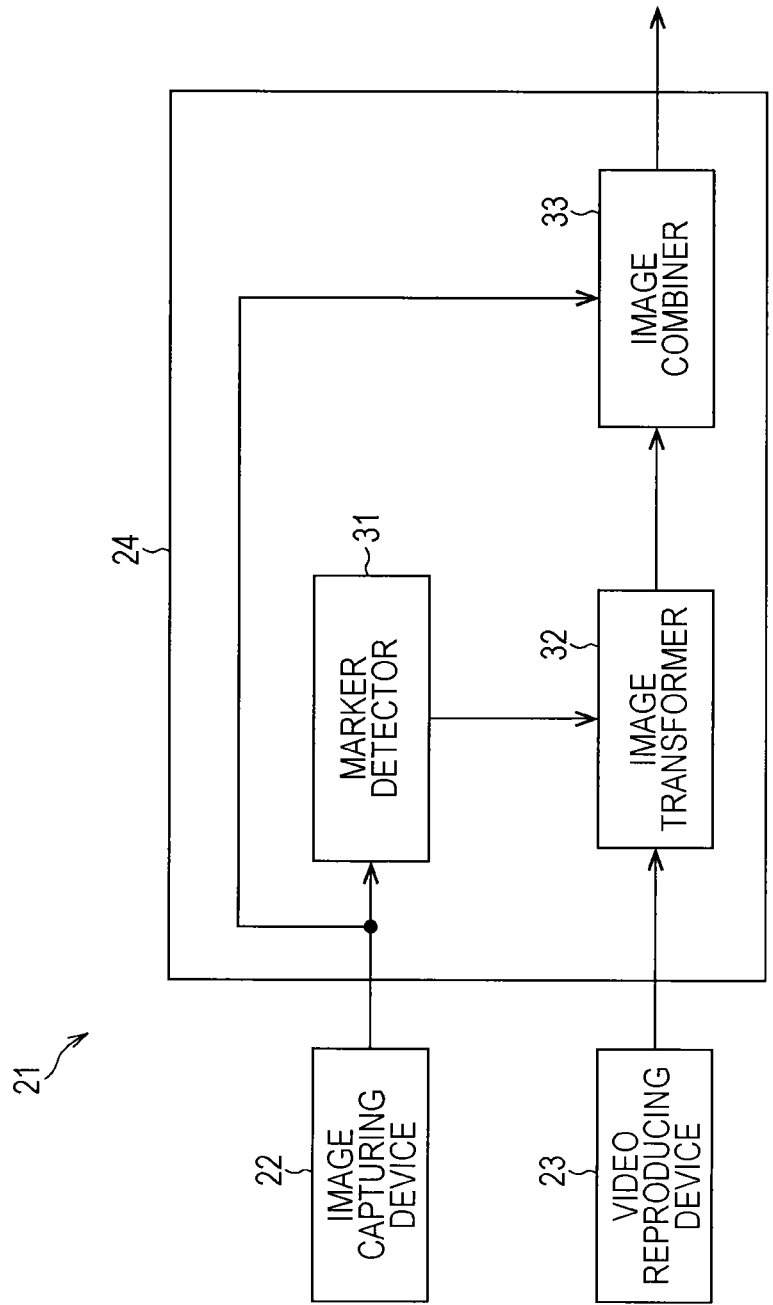
FIG. 2 is a block diagram showing an exemplary configuration of an image processing system which performs the image process of combining the image by replacing the marker with a replacement image.

The image process is implemented by the image processing system shown in FIG. 2.

As shown in FIG. 2, an image processing system 21 includes an image capturing device 22, a video reproducing device 23, and an image processor 24.

The image capturing device 22 corresponds to the camera 11 of FIG. 1, and provides the image processor 24 with the captured image 15 on which the marker 14 to be used for the combining process appears.

The video reproducing device 23 reproduces the replacement image 16 replaced by the marker 14 and pasted on the explanation board 13, provides the image processor 24 with the replacement image 16, and appropriately changes the replacement image 16 according to the proceeding of the explanation by the performer 12.

The image processor 24 includes a marker detector 31, an image transformer 32, and an image combiner 33, and performs the image process to replace the marker 14, appearing on the captured image 15 provided by the image capturing device 22, with the replacement image 16 provided by the video reproducing device 23.

The marker detector 31 detects the marker 14 appearing on the captured image 15 captured by the image capturing device 22, estimates the position and the posture of the detected marker 14, and provides the image transformer 32 with the estimation result.

The image transformer 32 transforms the replacement image 16 provided by the video reproducing device 23 based on the estimation result of the position and the posture of the marker 14 by the marker detector 31, and provides the image combiner 33 with the transformed replacement image 16.

The image combiner 33 combines and outputs the replacement image 16 transformed by the image transformer 32 on the area, where the marker 14 appears, on the captured image 15 captured by the image capturing device 22. The output image 17, on which the marker 14 on the explanation board 13 is replaced by the replacement image 16 according to the proceeding of the explanation, can be thereby obtained as a result of the desired combined result.

In the image process, in order to paste the output image 17 as if it is written on the explanation board 13 held by the performer 12, it is required to estimate the position and the posture of the marker 14 with higher accuracy. For example, the estimation result of the position and the posture of the marker 14 indicates which point on the captured image 15, output from the image capturing device 22, corresponds to the point on the marker 14.

Here, a correspondence relation between the point $(u_i, v_i)$ on the captured image 15 and the point $(x_i, y_i)$ on the marker 14 is represented by a homography matrix H with the homogeneous coordinate system expression. The homography matrix H is represented by 3×3 matrix as shown in Equation (1). However, in Equation (1), $(w_i u_i, w_i v_i, w_i)$ is the homogeneous coordinate of $(u_i, v_i)$. Furthermore, in the following description, it is assumed that distortion aberration of the lens of the camera 11 is determined in advance and the distortion aberration is removed.

[Mathematical Formula 1]

$$\begin{bmatrix} w_i u_i \\ w_i v_i \\ w_i \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_i \\ y_i \\ 1 \end{bmatrix} \quad (1)$$

Therefore, calculating the homography matrix H in Equation (1) means the process of estimating the position and the posture of the marker 14. Then, it is assumed that the homography matrix H has been calculated, and Equation (1) is converted to the following Equation (2).

[Mathematical Formula 2]

$$\begin{bmatrix} w_i/w_i \\ y_i/w_i \\ 1/w_i \end{bmatrix} = \begin{bmatrix} h_{00} & h_{01} & h_{02} \\ h_{10} & h_{11} & h_{12} \\ h_{20} & h_{21} & h_{22} \end{bmatrix}^{-1} \begin{bmatrix} u_i \\ v_i \\ 1 \end{bmatrix} \quad (2)$$

By using Equation (2), the point $(x_i, y_i)$ on the marker 14 can be calculated with respect to the point $(u_i, v_i)$ on the captured image 15. The image transformer 32 of FIG. 2 performs an image transformation by matching the pixel of the point $(x_i, y_i)$ on the replacement image 16 output from the video reproducing device 23. Furthermore, it is assumed that the sizes of the marker 14 and the replacement image 16 are the same, when these sizes are different, the image can be enlarged or reduced before performing the image transformation.

Next, the estimation process of the homography matrix H will be described.

The elements $h_{00}$ to $h_{22}$ of the homography matrix H have a degree of freedom as a constant multiplication. Therefore, for example, when $h_{22}=1$, and $w_i$ is eliminated, $h_{00}$ to $h_{21}$ are rearranged and Equation (1) is converted to the following Equation (3).

[Mathematical Formula 3]

$$\begin{bmatrix} x_i & y_i & 1 & 0 & 0 & 0 & -u_i x_i & -u_i y_i \\ 0 & 0 & 0 & x_i & y_i & 1 & -v_i x_i & -v_i y_i \end{bmatrix} \begin{bmatrix} h_{00} \\ h_{01} \\ h_{02} \\ h_{10} \\ h_{11} \\ h_{12} \\ h_{20} \\ h_{21} \end{bmatrix} = \begin{bmatrix} u_i \\ v_i \end{bmatrix} \quad (3)$$

Then, by Equation (3), if there are four relation points or more between the point $(u_i, v_i)$ on the captured image 15 and the point $(x_i, y_i)$ on the replacement image 16, the homography matrix H can be calculated.

When the performer 12 gradually raises the marker 14 being directed perpendicularly to the camera 11 in order to be captured by the camera 11, the pattern of the marker 14 comes into sight gradually stretching from the collapsed state. Consequently, on the output image 17, as the performer 12 raises the marker 14, the marker 14 comes into sight, whereas the video is created on which the marker 14 is suddenly replaced by the replacement image 16 when the marker 14 can be detected.

For example, an image processing result at the time of raising the marker 14 will be described with reference to FIG. 3.

FIG. 3A shows, from the left to the right, the state in which the lying marker 14 is being raised. FIG. 3B shows the image processing result based on the marker 14.

In other words, the left of FIG. 3A shows a deeply inclined state of the marker 14, the center of FIG. 3A shows a slightly raised state of the marker 14 from the state of the left marker 14, and the right of FIG. 3A shows the marker 14 captured from the right opposite. As shown in FIG. 3A, compared with the marker 14 at the right opposite, the pattern of the marker 14 is difficult to see as if it seems to be collapsed as the inclination angle become steeper. Accordingly, it is difficult to calculate the homography matrix H with high accuracy according to the inclination angle of the marker 14. In other words, when the marker 14 is inclined at a certain angle and more, it is difficult to correctly estimate the result by the above described method for calculating the homography matrix H with high accuracy determining many corresponding points.

Consequently, as shown in FIG. 3B, the marker 14 can be replaced by the replacement image 16 at a certain angle or more, whereas the marker 14 appears as it is at a certain angle or less. Although the scene, in which the performer 12 raises the explanation board 13, is usually limited and the time is short, the sense of incongruity is caused by discontinuity, which occurs because replacing the marker 14 with the replacement image 16 is seen. Especially, when the basic colors of the marker 14 and the replacement image 16 are different, the stronger sense of incongruity is caused.

Therefore, the present technique is to suppress the above described sense of incongruity by detecting the marker 14 by a plural of detection methods and performing the image process according to the state of the marker 14 appearing on the captured image 15.

Figure 4:
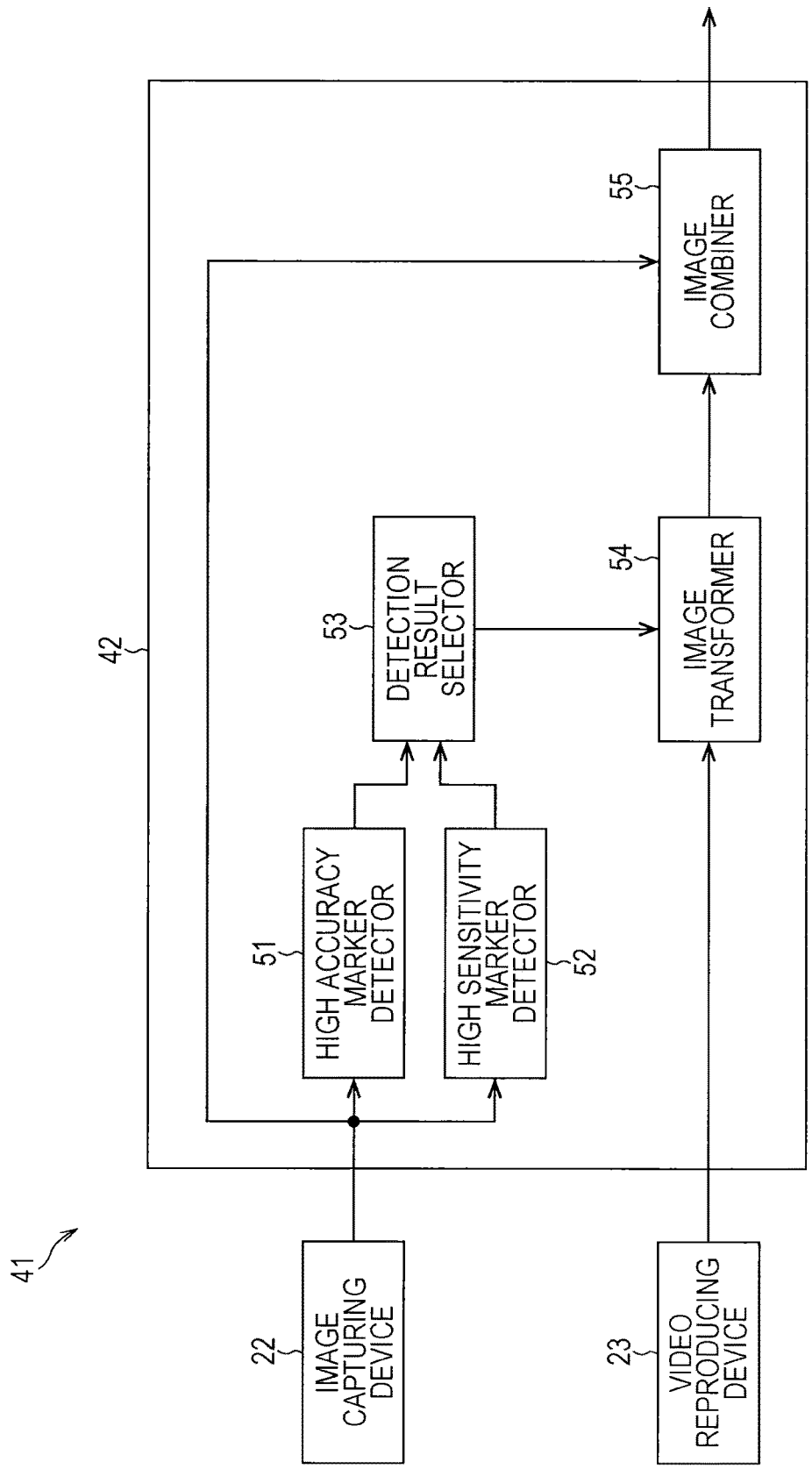
FIG. 4 is a block diagram showing an exemplary configuration of a first embodiment of the image processing system according to the present technique.

FIG. 4 is a block diagram showing an exemplary configuration of a first embodiment of the image processing system according to the present technique.

In FIG. 4, an image processing system 41 includes the image capturing device 22, the video reproducing device 23, and an image processor 42. In the image processing system 41, the image capturing device 22 and the video reproducing device 23 are similar to the image processing system 21 of FIG. 2 and the detailed description thereof is omitted.

The image processor 42 includes a high accuracy marker detector 51, a high sensitivity marker detector 52, a detection result selector 53, an image transformer 54, and an image combiner 55.

The high accuracy marker detector 51 detects the position and the posture of the marker 14 with high accuracy by using the correspondence relations as described above.

The high sensitivity marker detector 52 detects the marker 14 with lower accuracy than the high accuracy marker detector 51, but detects the marker 14 with high sensitivity by prioritizing detecting the marker 14 itself. The high sensitivity marker detector 52 detects the marker 14 using, for example, a chroma key process. The chroma key process is a method to stably detect a designated color pixel on an image and is used in various image combining processes. The high sensitivity marker detector 52 can stably detect the marker 14 on the captured image 15 by performing the process of detecting the area, where the marker 14 appears, on the captured image 15 using the chroma key process.

The detection result selector 53 selects the appropriate detection result for combining the image from the detection results by the high accuracy marker detector 51 and the high sensitivity marker detector 52, and outputs the result to the image transformer 54.

For example, when neither the high accuracy marker detector 51 nor the high sensitivity marker detector 52 has detected the marker 14, the detection result selector 53 determines that the marker 14 does not appear, and outputs the detection result of the marker in which the marker 14 does not appear. On the other hand, when both the high accuracy marker detector 51 and the high sensitivity marker detector 52 have detected the marker 14, the detection result selector 53 outputs the detection result of the high accuracy marker detector 51 as the detection result of the marker.

Furthermore, when either the high accuracy marker detector 51 or the high sensitivity marker detector 52 has detected the marker 14 and the other has not detected the marker 14, the detection result selector 53 outputs the detected detection result as the detection result of the marker.

The image transformer 54 transforms, based on the detection result of the marker 14 selected by the detection result selector 53, the replacement image 16 provided by the video reproducing device 23. Then, the image transformer 54 provides the image combiner 55 with the transformed replacement image 16.

The image combiner 55 combines and outputs the replacement image 16 transformed by the image transformer 54 on the area, where the marker 14 appears, on the captured image 15 captured by the image capturing device 22. The output image 17 can be thereby obtained as the desired combining result. When neither the high accuracy marker detector 51 nor the high sensitivity marker detector 52 has detected the marker 14 and the detection result of the marker indicates the marker 14 does not appear, the image combiner 55 simply outputs the captured image 15, captured by the image capturing device 22, as the output image 17. Thus, even when the marker 14 does not appear, it is possible to cope with the situation in which the marker 14 appears by continuously executing the image process by the image processor 42.

For example, it will be described that the situation in which the high accuracy marker detector 51 cannot correctly detect the marker 14 since the marker 14 is inclined at a certain angle and more, and the high sensitivity marker detector 52 can detect the marker 14 on the captured image 15. In this situation, the image process of painting the position of the marker 14 on the captured image 15 in the basic color according to that of the replacement image 16 to be replaced by the marker 14 is performed.

Figure 5:
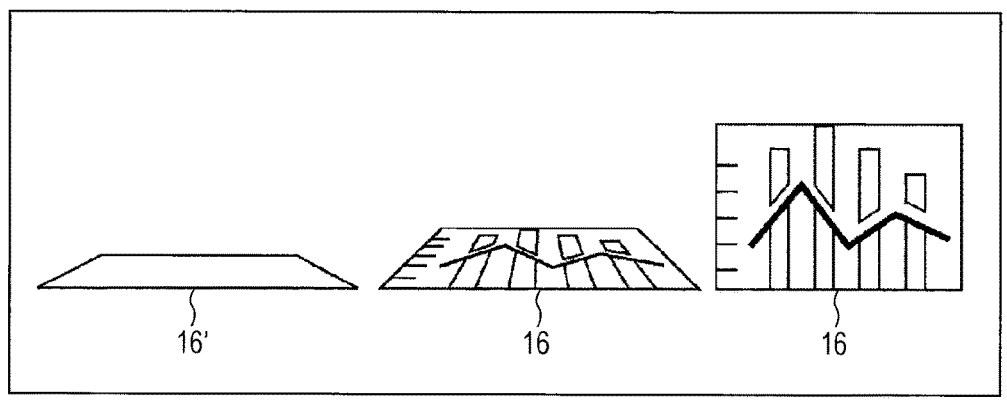
FIG. 5 is a diagram showing the image processing result at the time of raising the marker.

FIG. 5 shows the image processing result at the time of raising the marker when the image processor 42 has performed the image process.

Figure 3:
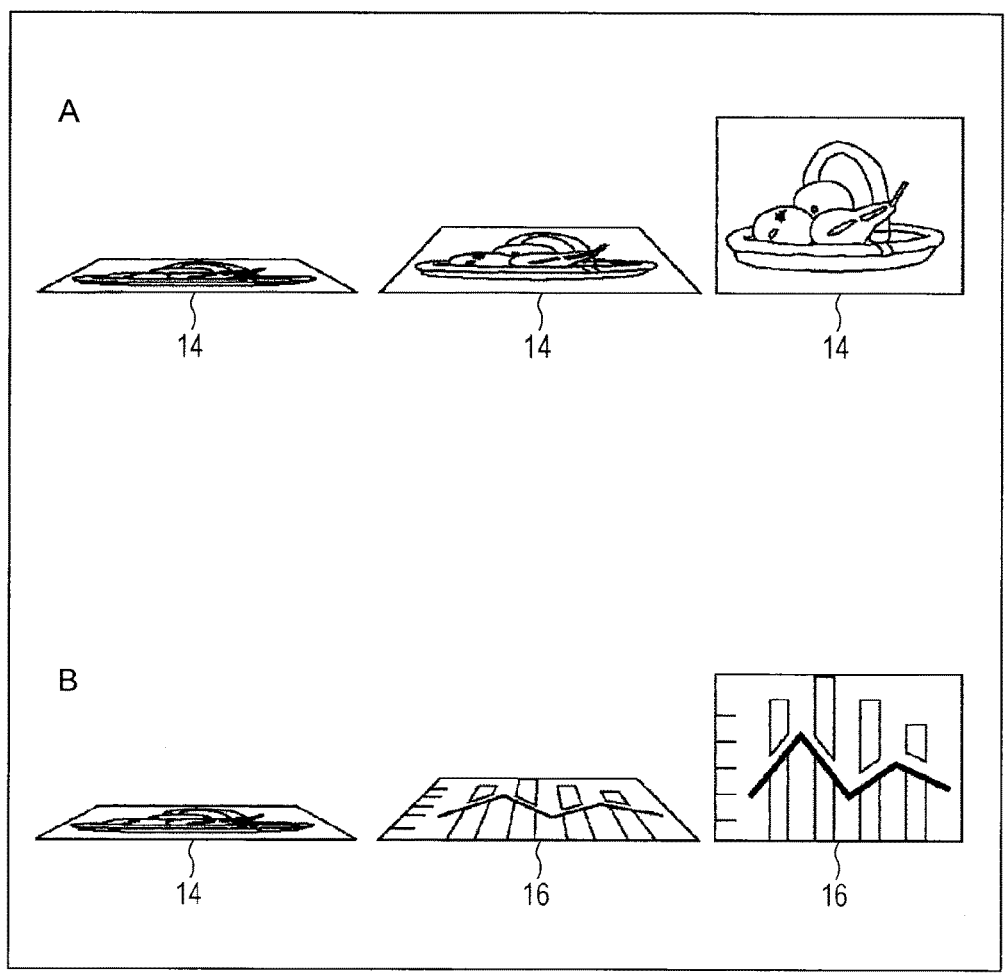
FIG. 3 is a diagram showing an image processing result at the time of raising the marker.

FIG. 5 shows the image processing result when the image process has been performed to the state in which the inclined marker 14 is being raised as shown in FIG. 3 A.

As shown in FIG. 5, when the marker 14 is inclined at a certain angle or less, it is possible to avoid that the marker 14 appears as it is by pasting, on the marker 14, the replacement image 16' including the basic color of the marker 14. As described with reference to FIG. 3, it is possible to suppress the sense of incongruity since the discontinuity does not occur. The discontinuity occurs because replacing the marker 14 with the replacement image 16 is seen.

As the basic color to replace the marker 14, the color calculated by the image transformer 54 or output from the video reproducing device 23 in advance can be used. Furthermore, when the marker 14 is simply painted over in the single basic color, the pixel color of the marker 14 determined by the chroma key process may be used as the basic color.

As described, it is possible to reduce the discontinuity by switching the marker 14, inclined at a certain angle or less, to the replacement image 16' painted in the basic color. The discontinuity occurs because the marker 14 appears on the output image 17.

Figure 6:
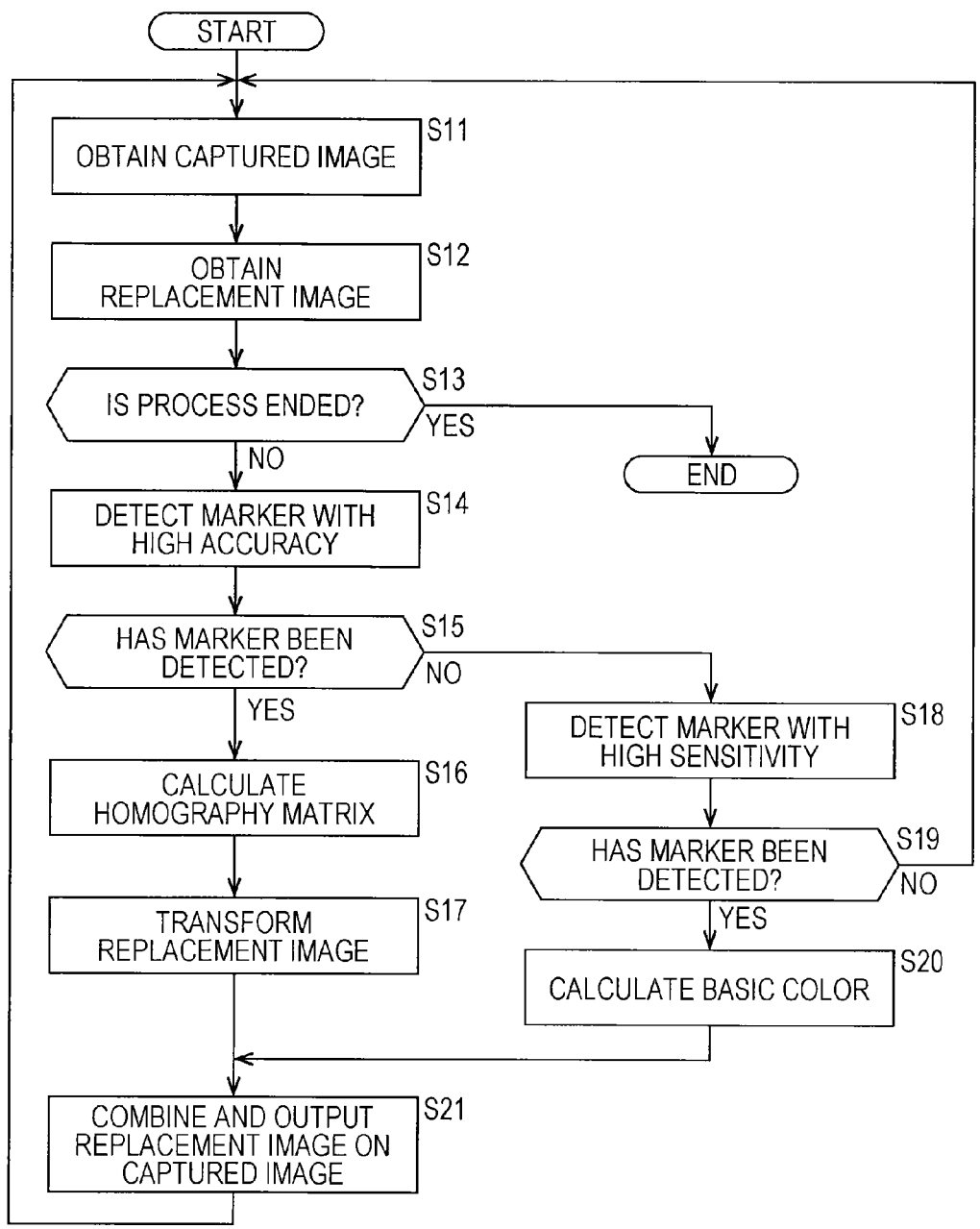
FIG. 6 is a flowchart to illustrate the image process by the image processing system.

Next, the image process by the image processing system 41 will be described with reference to the flowchart of FIG. 6.

In step S11, the high accuracy marker detector 51, the high sensitivity marker detector 52, and the image combiner 55 obtain the captured image 15, on which the marker 14 appears, output from the image capturing device 22.

In step S12, the image transformer 54 obtains the replacement image 16 output, synchronized with the proceeding of the explanation by the performer 12, from the video reproducing device 23.

In step S13, whether the process is ended or not is determined. For example, when the captured image 15 from the image capturing device 22 or the replacement image 16 from the video reproducing device 23 have not been obtained, or when other situation needs to end the process, the end of the process is determined in step S13 and the image process is ended. On the other hand, when the end of the process is not determined in step S13, the process advances to step S14.

In step S14, the high accuracy marker detector 51 performs the process of detecting the marker 14 with high accuracy to the captured image 15 obtained in step S11. The high accuracy marker detector 51 detects the marker 14 on the captured image 15 and provides the detection result selector 53 with the detection result.

In step S15, the detection result selector 53 determines whether the high accuracy marker detector 51 has detected the marker 14 or not. In step S14, when the detection result is provided by the high accuracy marker detector 51, the detection result selector 53 determines that the high accuracy marker detector 51 has detected the marker 14, and then the process advances to the step S16.

In step S16, the detection result selector 53 provides the image transformer 54 with the detection result of the marker 14 by the high accuracy marker detector 51, and the image transformer 54 calculates the homography matrix H using the above described Equation (3).

In step S17, the image transformer 54 transforms the replacement image 16 obtained in step S12 using the homography matrix H calculated in step S16. Then, the image transformer 54 provides the image combiner 55 with the replacement image 16 obtained by the transforming.

On the other hand, in step S15, when the detection result selector 53 determines that the high accuracy marker detector 51 has not detected the marker 14, in other words, when the detection result has not been provided by the high accuracy marker detector 51, the process advances to step S18.

In step S18, the high sensitivity marker detector 52 performs the process of detecting the marker 14 with high sensitivity to the captured image 15 obtained in step S11. The high sensitivity marker detector 52 detects the marker 14 on the captured image 15, and provides the detection result selector 53 with the detection result.

In step S19, the detection result selector 53 determines whether the high accuracy marker detector 51 has detected the marker 14 or not.

For example, in step S18 when the detection result has not been provided by the high sensitivity marker detector 52, in step S19 the detection result selector 53 determines that the high sensitivity marker detector 52 has not detected the marker 14, and the process returns to step S11. In other words, in this case, it is determined that the marker 14 does not appear on the captured image 15, and the similar process is repeated to the next captured image 15. On the other hand, in step S18 when the detection result has been provided by the high sensitivity marker detector 52, in step S19 the detection result selector 53 determines that the high sensitivity marker detector 52 has detected the marker 14, and the process advances to step S20.

In step S20, the image transformer 54 calculates the basic color from the replacement image 16, creates the replacement image 16' painted in the basic color, and provides the image combiner 55 with the replacement image 16' including the basic color.

After the process in step S17 or S20, the process advances to step S21. The image combiner 55 combines and outputs the replacement image 16, or the replacement image 16' on the captured image 15 obtained in step S11. The replacement image 16 has been transformed by the image transformer 54 in step S17. The replacement image 16', including the basic color, has been created by the image transformer 54 in step S20.

As described above, when the position and the posture of the marker 14 are difficult to estimate by the image processor 42, the image combining process is performed using the detection result obtained by prioritizing detecting the marker 14 over accuracy, when the position and the posture of the marker 14 can be estimated, the image combining process is performed using the detection result obtained by prioritizing estimation accuracy.

For example, when the pattern image of the marker 14 is difficult to see as if it seems to be collapsed as shown in the left of FIG. 3A, the image processor 42 uses the detection result by the high sensitivity marker detector 52 which prioritizes detecting the marker 14. As a result, the output image 17 replaced by the replacement image 16', including the basic color as shown in the left of the FIG. 5, is output. On the other hand, when the marker 14 is clearly seen as shown in the center and the right of FIG. 3A, the image processor 42 uses the output result by the high accuracy marker detector 51 which can estimate the position and the posture of the marker 14 with high accuracy. The output image 17 replaced by the replacement image 16, as shown in the center and the right of FIG. 5, is thereby output.

Therefore, the image processor 42 can avoid that the pattern image of the marker 14 appears as it is on the output image 17 regardless of the posture of the marker 14. It is possible to suppress the above described sense of incongruity and obtain the combining result with higher quality.

When the pattern image of the marker 14 is difficult to see as if it seems to be collapsed, it is also difficult for a human to recognize the posture of the marker 14. Therefore, if the replacement image 16 to be combined on the marker 14 includes errors of the position and the posture, which are used for combining, of the marker 14, the continuity of the marker 14 is maintained and it is possible to combine the image without causing the sense of incongruity.

Furthermore, in step S15, the process may advance to step S18 not only when the detection result selector 53 determines that the high accuracy marker detector 51 has not detected the marker 14, but also, for example, when the high accuracy marker detector 51 has detected the marker 14 but the detection accuracy is not high.

Furthermore, in step S20, instead of the process of creating the replacement image 16' by calculating the basic color from the replacement image 16, the process of estimating the area of the marker 14 using the position of the marker 14, detected by the high sensitivity marker detector 52, in the captured image 15 and pasting the replacement image 16 so as to be inserted within the area may be performed.

Figure 7:
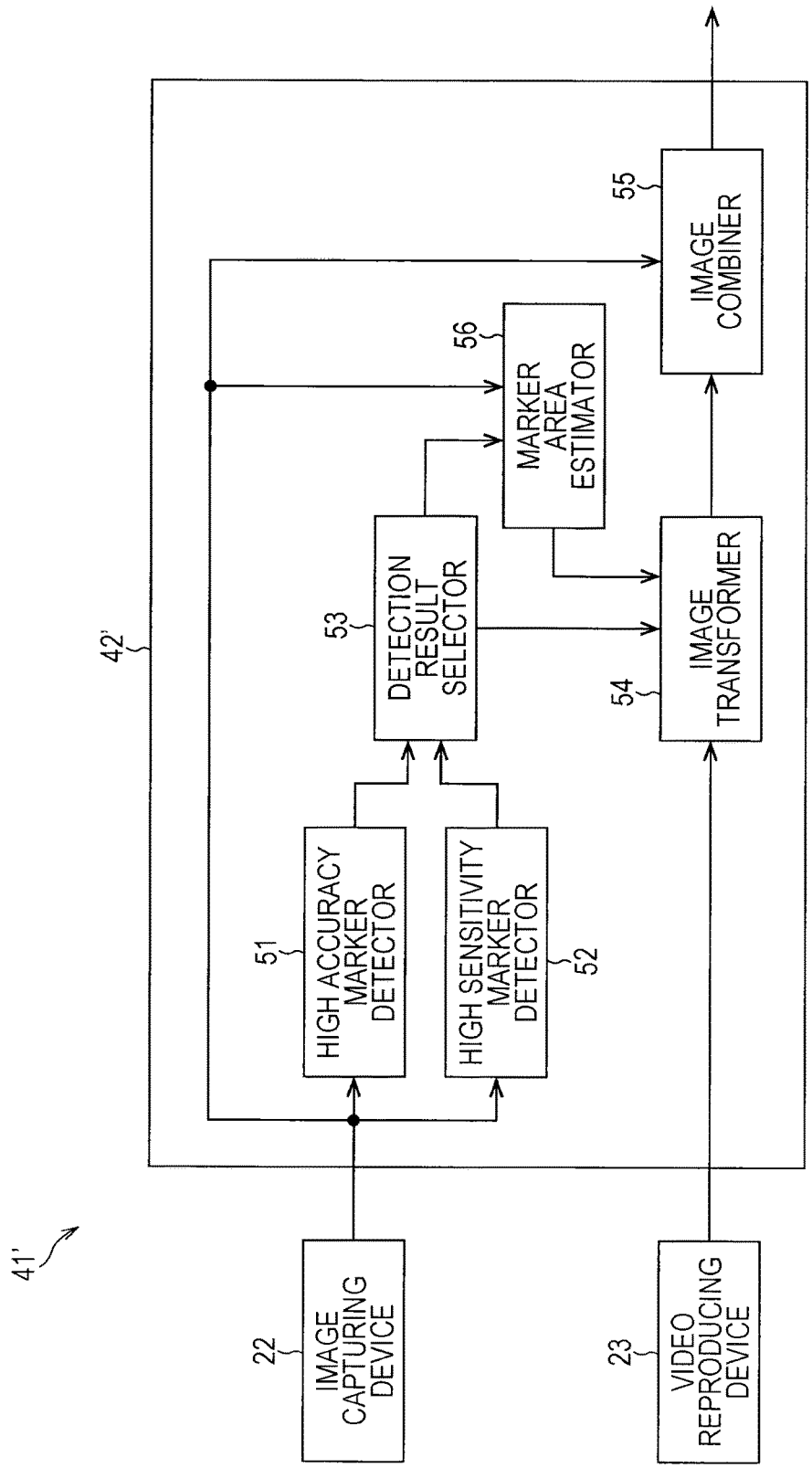
FIG. 7 is a block diagram showing an exemplary configuration of a second embodiment of the image processing system according to the present technique.

FIG. 7 is a block diagram showing an exemplary modification of the image processing system.

As shown in FIG. 7, the image processing system 41' includes the image capturing device 22 and the video reproducing device 23. The image processor 42' has a common configuration with the image processing system 41 of FIG. 4 in including the high accuracy marker detector 51, the high sensitivity marker detector 52, the detection result selector 53, the image transformer 54, and the image combiner 55. On the other hand, the image processing system 41' has a different configuration from the image processing system 41 in that the image processor 42' includes a marker area estimator 56.

When the marker 14 has not been detected by the high accuracy marker detector 51, the marker area estimator 56 estimates the area where the marker 14 appears based on the detection result by the high sensitivity marker detector 52.

Figure 10:
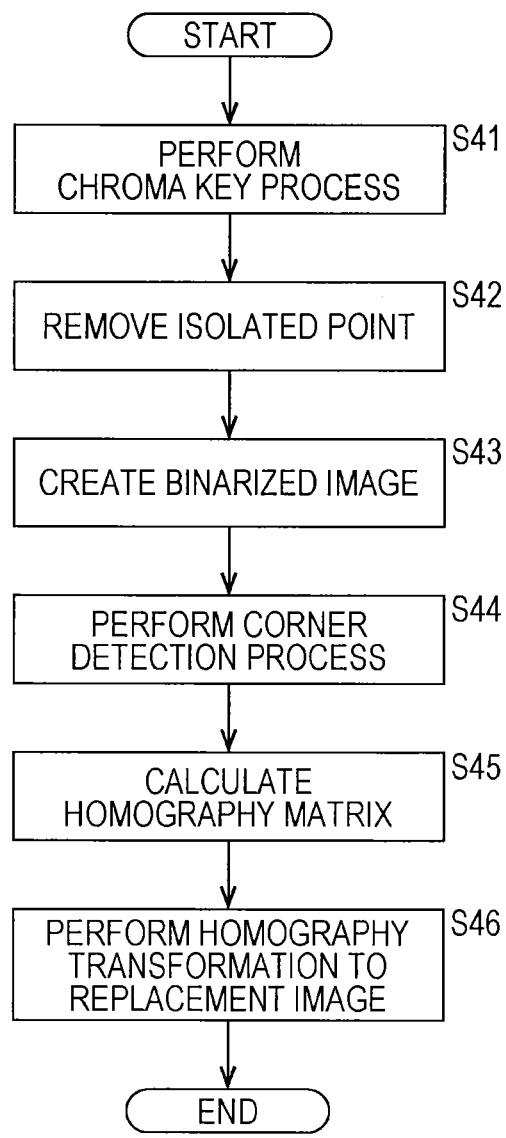
FIG. 10 is a flowchart to illustrate a second example of the estimation process of estimating the marker area.
Figure 11:
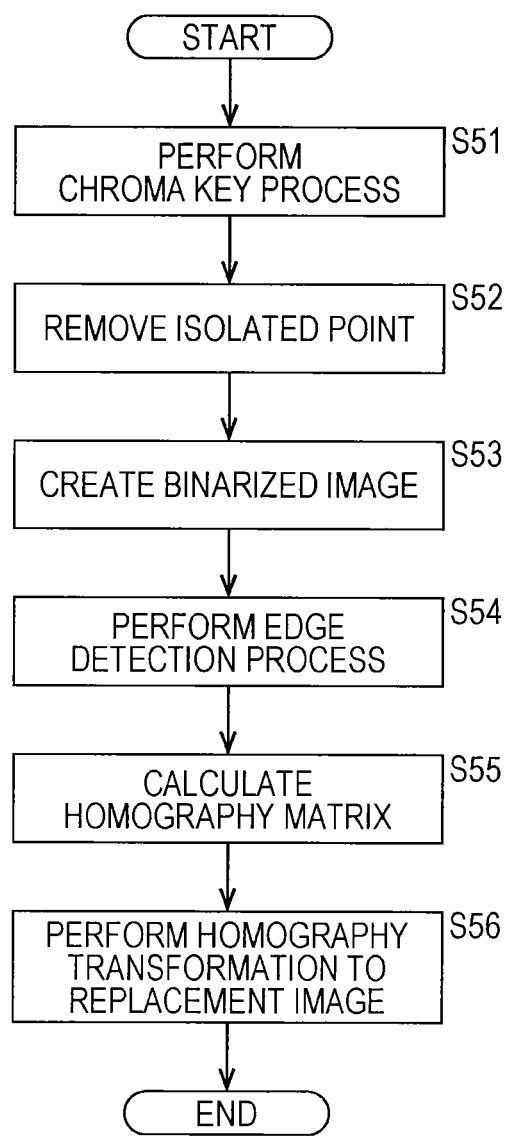
FIG. 11 is a flowchart to illustrate a third example of the estimation process of estimating the marker area.

For example, the marker area estimator 56 classifies the pixel into the pixel having a color component used for a key and the pixel having the other color components based on the result of the chroma key process. When the captured image 15 is binarized according to the classification and an unnecessary isolated point is found, the isolated point is removed. Then, the marker area estimator 56 can estimate that a rectangular region, obtained by the maximum value and the minimum value of the coordinates of the key component pixel, is a marker area (FIG. 9), and can estimate the marker area by performing a corner detection process or an edge detection process to the binarized image (FIG. 10 or 11).

The image transformer 54 can thereby transform the replacement image 16 so as to be inserted within the area estimated by the marker area estimator 56 and the image combiner 55 can combine and output the replacement image 16 transformed by the image transformer 54.

Figure 8:
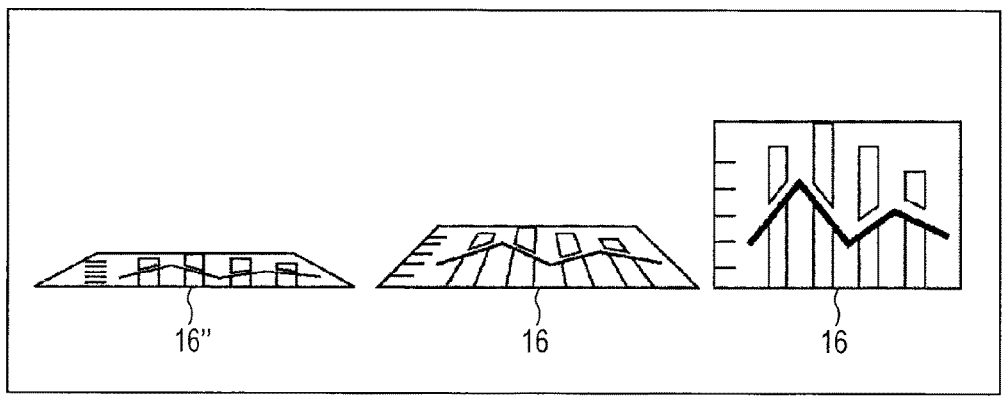
FIG. 8 is a diagram showing the image processing result at the time of raising the marker.

For example, as shown in FIG. 8, when the marker 14 is inclined at a certain angle or less, by pasting, on the marker 14, a replacement image 16" transformed so as to be inserted within the area estimated by the marker area estimator 56, it is possible to avoid that the marker 14 appears as it is.

A first example of the estimation process performed by the marker area estimator 56 will be described with reference to a flowchart of FIG. 9.

In step S31, the marker area estimator 56 performs the chroma key process to the captured image 15 output from the image capturing device 22.

In step S32, the marker area estimator 56 performs the process of removing the isolated point from the captured image 15 to which the chroma key process has been performed in step S31. The process of removing the isolated point can be performed as necessary.

In step S33, the marker area estimator 56 performs the process of binarizing the captured image 15 from which the isolated point has been removed in step S32.

In step S34, the marker area estimator 56 scans the captured image 15 binarized in step S33 and calculates the maximum value $x_{max}$ and $y_{max}$, and the minimum value $x_{min}$ and $Y_{min}$ of the coordinates (x, y) of the key component pixel.

In step S35, the marker area estimator 56 estimates that the rectangular region is the area of the marker 14. The rectangular region has four vertex coordinates $(x_{min}, y_{min})$, $(x_{max}, y_{min})$ $(x_{max}, y_{max})$ and $(x_{min}, y_{max})$ on the captured image 15. Then, the marker area estimator 56 provides the image transformer 54 with the four coordinates.

In step S36, the image transformer 54 transforms and outputs the replacement image 16 obtained from the video reproducing device 23 so as to be inscribed within the rectangular region estimated by the marker area estimator 56 in step S25.

As described above, the image processor 42' can calculate the maximum value and the minimum value of the coordinates of the area of the marker 14 from the key image obtained by the chroma key process and can perform the process of pasting the replacement image 16" within the rectangular enclosed by these coordinates (FIG. 8).

Next, a second example of the estimation process performed by the marker area estimator 56 will be described with reference to the flowchart of FIG. 10.

Figure 9:
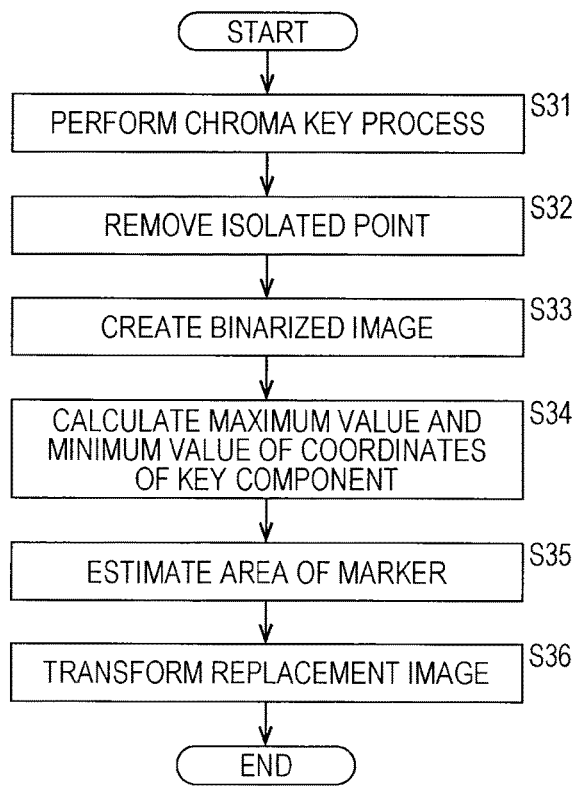
FIG. 9 is a flowchart to illustrate a first example of an estimation process of estimating a marker area.

The each process in step S41 to step S43 is similarly performed to that in step S31 to step S33 of FIG. 9 and the description will be omitted.

In step S44, the marker area estimator 56 performs the corner detection process to the captured image 15 which has been binarized in step S43 and detects the vertex positions of the marker 14. Although it is assumed that the quadrangular marker 14 is used, the corner detection process can be performed to a polygonal shape having four sides or more.

In step S45, the marker area estimator 56 calculates the homography matrix H from the vertex positions of the marker 14 which has been detected in step S44 and provides the image transformer 54 with the homography matrix H.

In step S46, the image transformer 54 transforms and outputs the replacement image 16 output from the video reproducing device 23 by performing the homography transformation using the homography matrix H which has been calculated by the marker area estimator 56 in step S45. Then, the process is ended.

As described above, the image processor 42' performs the corner detection process to the key image obtained by the chroma key process and calculates the vertex of the marker 14. When the marker 14 has a polygonal shape having four sides or more, it is possible to calculate the homography matrix H by the Equation (3) using the corresponding relation between the calculated vertex and the vertex of the marker 14. Therefore, by using the calculated homography matrix H it is possible to calculate that which pixel of the replacement image 16, obtained from the video reproducing device 23, corresponds to the pixel on the captured image 15, and to paste the replacement image 16 on the area of the marker 14 which has been estimated by the marker area estimator 56.

Next, a third example of the estimation process performed by the marker area estimator 56 will be described with reference to the flowchart of FIG. 11.

The each process in step S51 to step S53 is similarly performed to that in step S31 to step S33 of FIG. 9 and the description will be omitted.

In step S54, the marker area estimator 56 performs the edge detection process to the captured image 15 which has been binarized in step S53 and detects the sides of the marker 14. Although it is assumed that the quadrangular marker 14 is used as described above, the edge detection process can be performed to a polygonal shape having four sides or more.

In step S55, the marker area estimator 56 determines that the points of intersection of the sides, which have been detected in step S54, of the marker 14 are the vertices of the marker 14, calculates the homography matrix H based on these vertex positions, and provides the image transformer 54 with the homography matrix H.

In step S56, the image transformer 54 transforms and outputs the replacement image 16 output from the video reproducing device 23 by performing the homography transformation using the homography matrix H which has been calculated by the marker area estimator 56 in step S55. Then, the process is ended.

As described above, the image processor 42' performs the edge detection process to the key image which has been obtained by the chroma key process and calculates the vertex of the marker 14 based on the point of intersection of vertex of the side. When the marker 14 has a polygonal shape having four sides or more, the homography matrix H can be calculated by Equation (3) using the corresponding relation between the calculated vertex and the vertex of the marker 14. Therefore, by using the calculated homography matrix H, it is possible to calculate that which pixel of the replacement image 16, obtained from the video reproducing device 23, corresponds to the pixel of the captured image 15 and to paste the replacement image 16 on the area of the marker 14 which has been estimated by the marker area estimator 56.

Furthermore, it is also possible to paste the replacement image 16 on the marker 14 by determining four corresponding points or more from the detected area of the marker 14 and calculating the homography matrix H. Even when the homography matrix H cannot be correctly calculated and the homography matrix H has some errors since the marker 14 is deeply inclined, it is possible to cause less sense of incongruity than when the marker 14 is output as it is.

The process of detecting the marker 14 with high sensitivity by the high accuracy marker detector 51 will be described.

In order to detect the marker 14 with high sensitivity by the high accuracy marker detector 51, the marker 14 having a component for rough detection and a component for detail detection is used. The high accuracy marker detector 51 detects the marker 14 in two steps using the component for rough detection and the component for detail detection.

Figure 12:
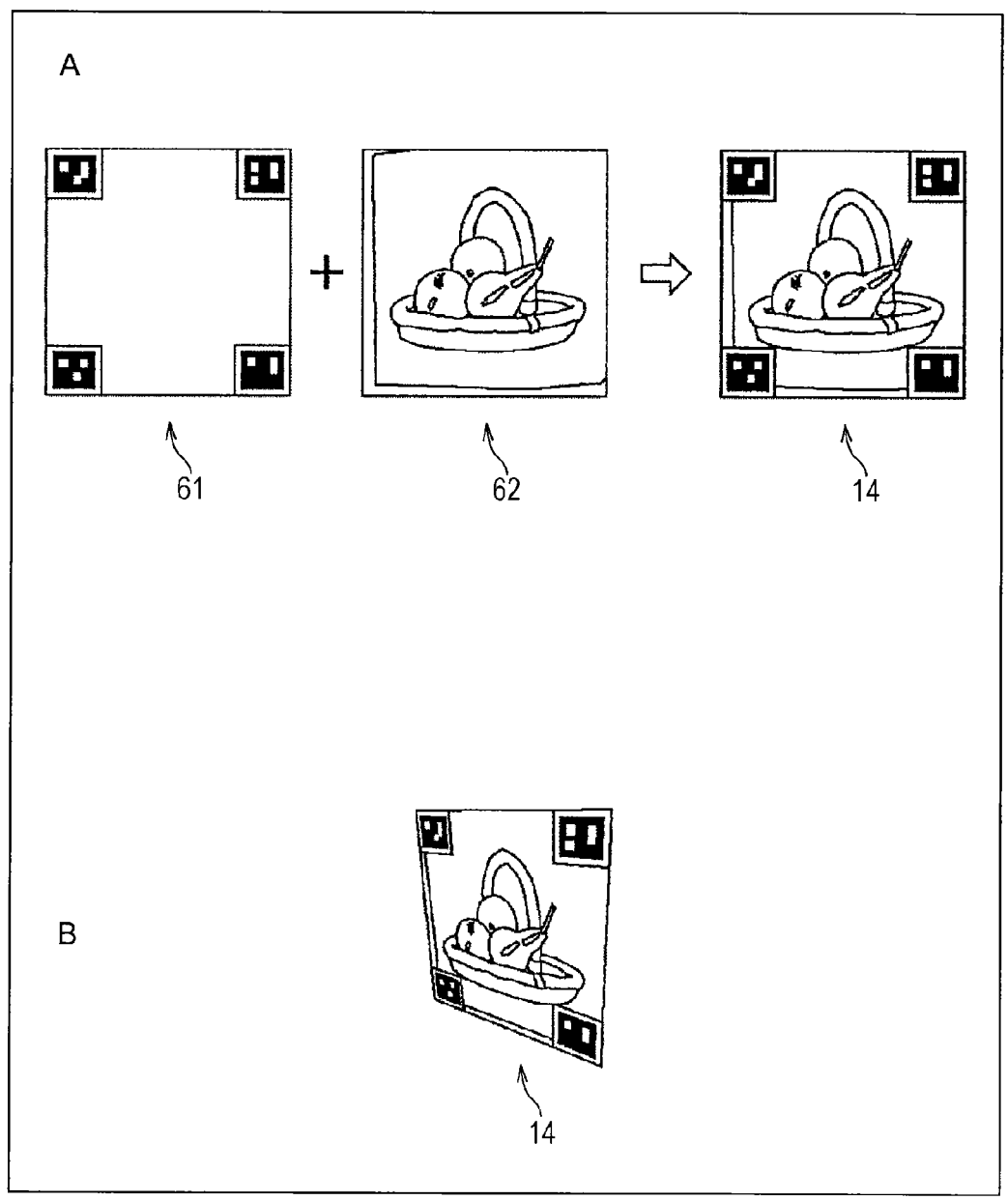
FIG. 12 is a diagram showing the marker having a component for rough detection and a component for detail detection.

FIG. 12 shows an example of the marker 14 having the component for rough detection and the component for detail detection.

As shown in FIG. 12A, an image for rough detection 61, on which two-dimensional codes as the component for rough detection are arranged in four corners, and a natural image as an image for detail detection 62 are superimposed, and both components spatially coexist in the marker 14. FIG. 12B shows a segmentation of only the marker 14 portion from the image on which the marker 14 has been captured from a diagonal direction.

Since the image for rough detection 61 has no fine pattern, such as a two-dimensional code, it is possible to relatively stably detect the image when the image is captured apart from the camera 11 and slightly appears. With the image for rough detection 61, as shown in FIG. 12B, when the marker 14 is captured from a diagonal direction, in other words, when the image is projective-transformed because the camera 11 is not the right opposite to the marker 14, it is possible to reduce the influence of distortion by the projective transformation.

Furthermore, since it is possible to reduce the load of the detection process with the image for rough detection 61, the image for rough detection 61 is an appropriate detecting index to the component for rough detection. The image for rough detection 61 is also appropriate to the component for rough detection when the image appears largely or is captured from the front.

In other words, the high accuracy marker detector 51 performs a rough detection, which is the detection process with a light computing load, of the marker 14 using the component for rough detection of the marker 14. Thereafter, the high accuracy marker detector 51 performs a detail detection, which is the detection process with a heavy computing load but with high position-accuracy, of the marker 14 using the component for detail detection of the marker 14. Then, by calculating the homography matrix H from the detailed detection result of the marker 14, the high accuracy marker detector 51 provides the detection result selector 53 with the detection result obtained by estimating the position and the posture of the marker 14.

The high accuracy marker detector 51 performs an image transformation to the image for rough detection 61, captured from a diagonal direction, using four center points of the two-dimensional codes and performs a coarse correction to transform the marker 14 to the image on which the marker 14 seems to be captured from the front.

In other words, by the coarse correction, the image for rough detection 61, shown in the left of FIG. 13A, is transformed to the image for rough detection 61', shown in the right of FIG. 13A. In this transformation, the position is not limited to the four center points of the two-dimensional codes of the image for rough detection 61, and may be set anywhere.

The transformation shown in FIG. 13A can be performed as shown in the following Equation (4), when $(u_i, v_i)$ is calculated with respect to the coordinates $(u_i', v_i')$ of the image for rough detection 61' which has been corrected, and the pixel value of the image for rough detection 61 which has not been corrected is obtained by calculating the homography matrix H' by the above Equation (3).

[Mathematical Formula 4]

$$\begin{bmatrix} w_i' u_i \\ w_i' v_i \\ w_i' \end{bmatrix} = \begin{bmatrix} h_{00}' & h_{01}' & h_{02}' \\ h_{10}' & h_{11}' & h_{12}' \\ h_{20}' & h_{21}' & h_{22}' \end{bmatrix} \begin{bmatrix} u_i' \\ v_i' \\ 1 \end{bmatrix} \quad (4)$$

Figure 13:
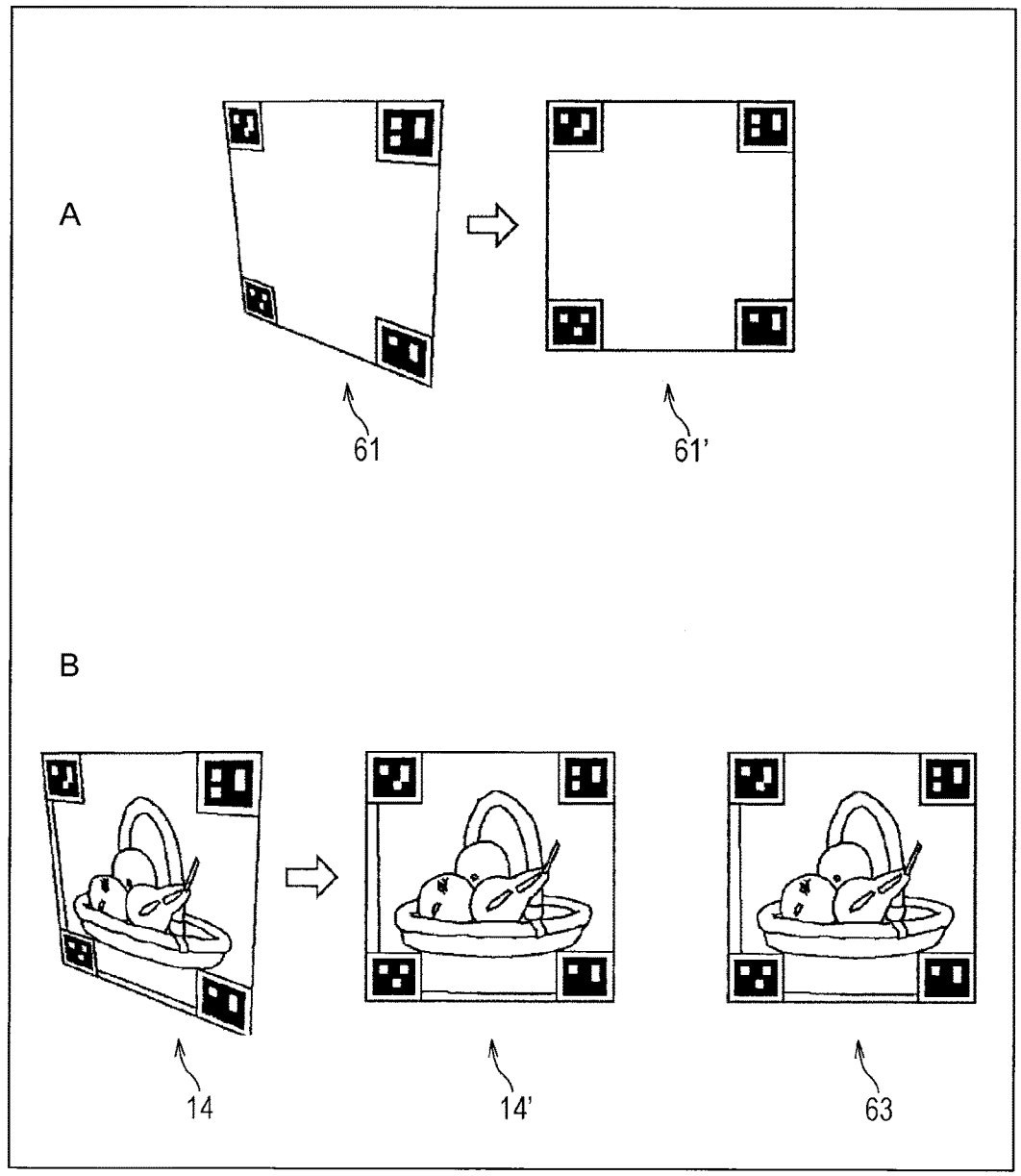
FIG. 13 is a diagram to illustrate a coarse correction and a matching of the marker.

When the marker 14 is actually corrected using the image for rough detection 61, the marker 14 shown in the left of FIG. 13B is corrected to obtain the marker 14' shown in the center of FIG. 13 B. Since the correction uses the image for rough detection 61 and projective components slightly remain, the marker 14' is slightly different form an original marker image 63 (the original image of the marker 14) shown in the right of FIG. 13 B.

Then, the high accuracy marker detector 51 performs a detection process using the detail component. In other words, the high accuracy marker detector 51 performs a block matching (pattern recognition) of a specific point on the natural image at the resolution of the original marker image 63. The natural image has a pattern with which the matching in detail can be performed in many points, and the matching process can be stably performed. The detection process by the high accuracy marker detector 51 is not limited to the natural image and the block matching and the like.

Now, with respect to the original marker image 63, when the marker 14 or the marker 14' is searched for the specific point on the image (many points which are easily distinguished in performing the block matching), searching the marker 14' can obtain the search result with higher block consistency and remarkably higher sensitivity compared with searching the highly projective-transformed marker 14. Therefore, by correcting the marker 14 captured by using the detection result obtained by using the component for rough detection, and by performing the matching between the marker 14' and the original marker image 63, the high accuracy marker detector 51 can improve the detection accuracy of the component for detail detection.

With regard to each of the process as described above with reference to the flowchart, the process is not necessarily performed in chronological order according to the flowchart, and includes a process executed in parallel or independently (for example, a parallel process or a process by an object). The program may be performed by one central processing unit (CPU) or distribution-processed by a plurality of CPUs. Furthermore, in the specification, a system means a whole device including a plurality of devices.

The above described series of processes (an information processing method) can be executed by a hardware or a software. When the series of processes are executed by a software, a program consisting the software is installed, from a program recording medium recording the program, to a computer embedded in a dedicated hardware, or a general-purpose personal computer, which can execute various functions by installing various programs.

Figure 14:
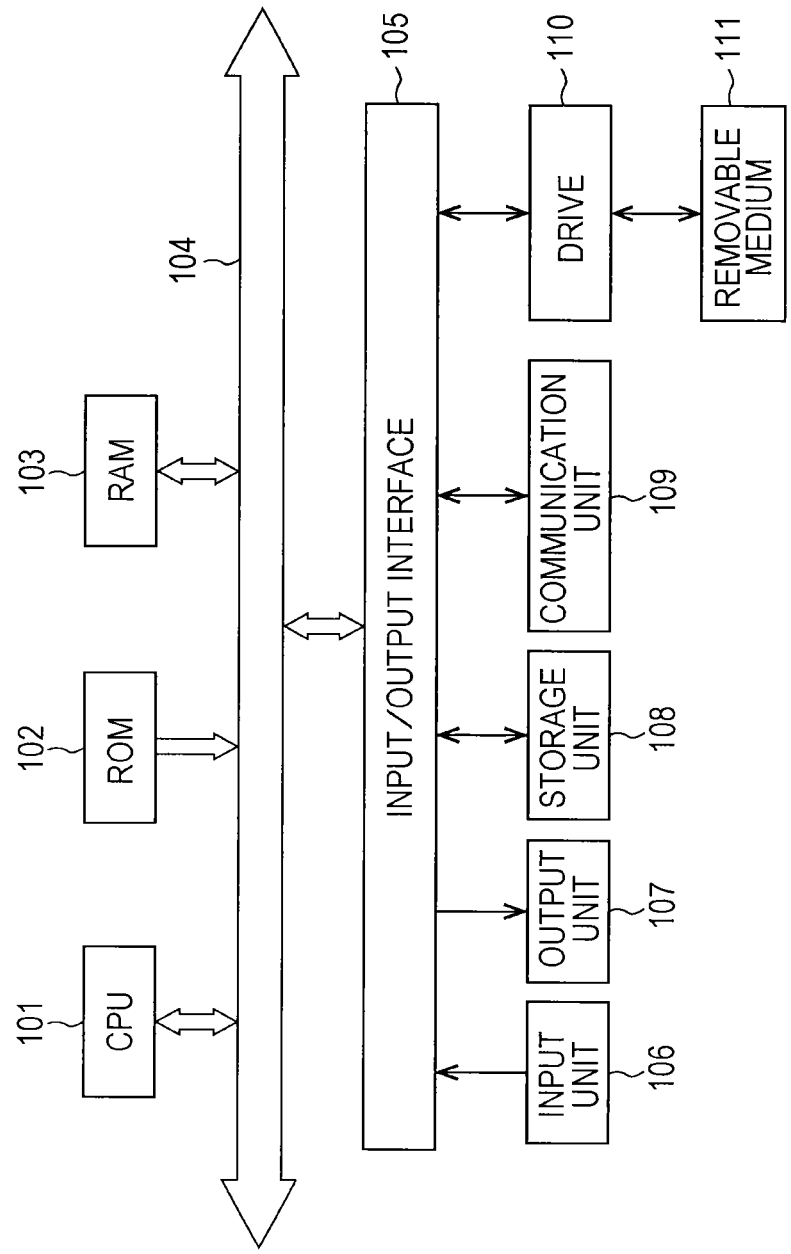
FIG. 14 is a block diagram showing an exemplary configuration of an embodiment of a computer according to the present technique.

FIG. 14 is a block diagram showing an exemplary configuration of a hardware of a computer executing the series of processes by a program.

In the computer, a central processing unit (CPU) 101, a read only memory (ROM) 102, and a random access memory (RAM) 103 are connected to each other by a bus 104.

The bus 104 is connected to an input/output interface 105. The input/output interface 105 is connected to an input unit 106 (e.g., a key board, a mouse, and a microphone), an output unit 107 (e.g., a display and a speaker), a storage unit 108 (e.g., a hard disk and a non-volatile memory), a communication unit 109 (e.g., a network interface), and a drive 110 which drives a removable medium 111 (e.g., a magnetic disk, an optical disk, a magneto-optical disk, or a semiconductor memory).

In the computer having the above described configuration, the series of processes are performed by loading the program recorded, for example, in the storage unit 108 to the RAM 103 through the input/output interface 105 and the bus 104 and executing the program by the CPU 101.

The program executed by the computer (CPU 101) is provided by being stored in the removable medium 111 as a package medium, such as a magnetic disk (including a flexible disk), an optical disk (e.g., a compact disc-read only memory (CD-ROM), a digital versatile disc (DVD)), an magneto-optical disk, or a semiconductor memory, or is provided thorough a wired/radio transmission medium, such as a local area network, an internet, or a digital satellite broadcast.

The program can be installed to the storage unit 108 through the input/output interface 105 by mounting the removable medium 111 to the drive 110. The program can be received, thorough a wired/radio transmission medium, by the communication unit 109 and installed to the storage unit 108. Furthermore, the program can be installed to the ROM 102 and the storage unit 108 in advance.

Furthermore, the present technique may have the configurations as follows.

(1)

An image processing device including:

a plurality of detectors configured to each detect a marker appearing on an image by a different detection method; and a selector configured to select, from detection results of the marker by the detectors, the detection result to be used in an image process using the marker.

(2)

The image processing device according to (1), further including an image combiner configured to combine, on the image, a replacement image to be replaced and displayed, based on the detection result of the marker selected by the selector, on an area where the marker appears on the video.

(3)

The image processing device according to (1) or (2), wherein the detectors include at least a high accuracy detector configured to detect the marker with high accuracy and a high sensitivity detector configured to detect the marker with high sensitivity, and the image processing device further includes an image transformer configured to transform the replacement image and provide the image combiner with the transformed replacement image according to a position and a posture of the marker based on the detection result by the high accuracy detector, when the detection result by the high accuracy detector is selected by the selector.

(4)

The image processing device according to any of (1) to (3), wherein the image combiner performs a process of painting a position of the marker in a basic color based on that of the replacement image, when the detection result by the high sensitivity detector is selected by the selector.

(5)

The image processing device according to any of (1) to (4), further including an estimator configured to estimate an area where the marker appears based on the detection result by the high sensitivity detector.

(6)

The image processing device according to any of (1) to (5), wherein the image transformer transforms the replacement image so as to be inscribed within the area, where the marker appears, estimated by the estimator.

(7)

The image processing device according to any of (1) to (6), wherein the estimator detects a vertex position of the estimated area where the marker appears, and the image transformer transforms the replacement image based on the vertex position detected by the estimator.

(8)

The image processing device according to any of (1) to (7), wherein the estimator detects sides of the estimated area where the marker appears, and the image transformer transforms the replacement image based on a point of intersection of the sides detected by the estimator.

(9)

The image processing device according to any of (1) to (8), wherein when the detection results by the high accuracy detector and by the high sensitivity detector indicate both of the detectors have not detected the marker, the selector determines that the marker does not appear on the image.

(10)

The image processing device according to any of (1) to (9), wherein when the detection results by the high accuracy detector and by the high sensitivity detector indicate both of the detectors have detected the marker, the selector selects the detection result by the high accuracy detector.

(11)

The image processing device according to any of (1) to (10), wherein when the detection results by the high accuracy detector and by the high sensitivity detector indicate either of the detectors has detected the marker, the selector selects the detection result by the detector which has detected the marker.

(12)

The image processing device according to any of (1) to (11), wherein the high sensitivity detector detects the marker by a detection method for extracting a designated color from the image.

(13)

The image processing device according to any of (1) to (12), wherein the high accuracy detector detects the marker by a detection method for performing a pattern recognition to a known pattern used for the marker.

(14)

The image processing device according to any of (1) to (13), wherein after transforming the marker to an image on which the marker seems to be captured from a front using a component for rough detection, the high accuracy detector performs the pattern recognition using a component for detail detection.

The present embodiments are not limited to the above mentioned embodiments, and various modifications can be made without departing from the scope and spirit of the disclosure.

REFERENCE SIGNS LIST 11 camera
12 performer
13 explanation board
14 marker
15 captured image
16 replacement image
17 output image
21 image processing system
22 image capturing device
23 video reproducing device
24 image processor
31 marker detector
32 image transformer
33 image combiner
41 image processing system
42 image processor
51 high accuracy marker detector
52 high sensitivity marker detector
53 detection result selector
54 image transformer
55 image combiner
56 marker area estimator

The invention claimed is:

1. An image processing device comprising:
circuitry configured to
detect a marker appearing in an image by extracting a predetermined pattern of the marker from the image;
in the event that the marker is detected in the image by extracting the predetermined pattern, replace an area of the marker in the image with a replacement image;
in the event that the marker is not detected in the image by extracting the predetermined pattern,
detect the marker by extracting a predetermined color of the marker from the image; and
in the event that the marker is detected in the image by extracting the predetermined color, calculate a basic color of the replacement image; and replace an area of the marker in the image with the basic color, which is different than the replacement image.

2. The image processing device according to claim 1, wherein extracting the predetermined pattern of the marker from the image detects the marker with high accuracy and extracting the predetermined color of the marker from the image detects the marker with high sensitivity, and the circuitry is further configured to transform the replacement image and replace the area of the marker with the transformed replacement image according to a position and a posture of the marker, in the event that the marker is detected in the image by extracting the predetermined pattern.

3. The image processing device according to claim 2, wherein the circuitry is further configured to estimate an area where the marker appears based on the detection of the marker with high sensitivity.

4. The image processing device according to claim 3, wherein the circuitry transforms the replacement image so as to be inscribed within the estimated area, where the marker appears.

5. The image processing device according to claim 3, wherein the circuitry detects a vertex position of the estimated area where the marker appears, and the circuitry transforms the replacement image based on the detected vertex position.

6. The image processing device according to claim 3, wherein the circuitry detects sides of the estimated area where the marker appears, and the circuitry transforms the replacement image based on a point of intersection of the detected sides.

7. The image processing device according to claim 2, wherein in the event that the detection results of the marker with high accuracy and with high sensitivity indicate both of the detection results have not detected the marker, the circuitry determines that the marker does not appear on the image.

8. The image processing device according to claim 2, wherein in the event that the detection results of the marker with high accuracy and with high sensitivity indicate both of the detection results have detected the marker, the circuitry selects the detection result of the marker with high accuracy.

9. The image processing device according to claim 2, wherein in the event that the detection results of the marker with high accuracy and with high sensitivity indicate either of the detection results has detected the marker, the circuitry selects the detection result which has detected the marker.

10. The image processing device according to claim 1, wherein detecting the marker by extracting the predetermined pattern includes first detecting a component for rough detection, then detecting a component for detail detection.

11. An image processing method comprising:

detecting a marker appearing in an image by extracting a predetermined pattern of the marker from the image;

in the event that the marker is detected in the image by extracting the predetermined pattern, replacing an area of the marker in the image with a replacement image;

in the event that the marker is not detected in the image by extracting the predetermined pattern, detecting the marker by extracting a predetermined color of the marker from the image; and in the event that the marker is detected in the image by extracting the predetermined color, calculating a basic color of the replacement image; and replacing an area of the marker in the image with the basic color, which is different than the replacement image.

12. A non-transitory computer-readable storage medium storing computer-readable instructions thereon, which, when executed by a computer, cause the computer to execute an image process comprising:

detecting a marker appearing in an image by extracting a predetermined pattern of the marker from the image;

in the event that the marker is detected in the image by extracting the predetermined pattern, replacing an area of the marker in the image with a replacement image;

in the event that the marker is not detected in the image by extracting the predetermined pattern, detecting the marker by extracting a predetermined color of the marker from the image; and in the event that the marker is detected in the image by extracting the predetermined color, calculating a basic color of the replacement image; and replacing an area of the marker in the image with the basic color, which is different than the replacement image.

* * * * *